Dec. 29, 1953  G. HAMMOND  2,664,060
MACHINE FOR CLOSING CONTAINERS
Filed March 23, 1950  2 Sheets-Sheet 1
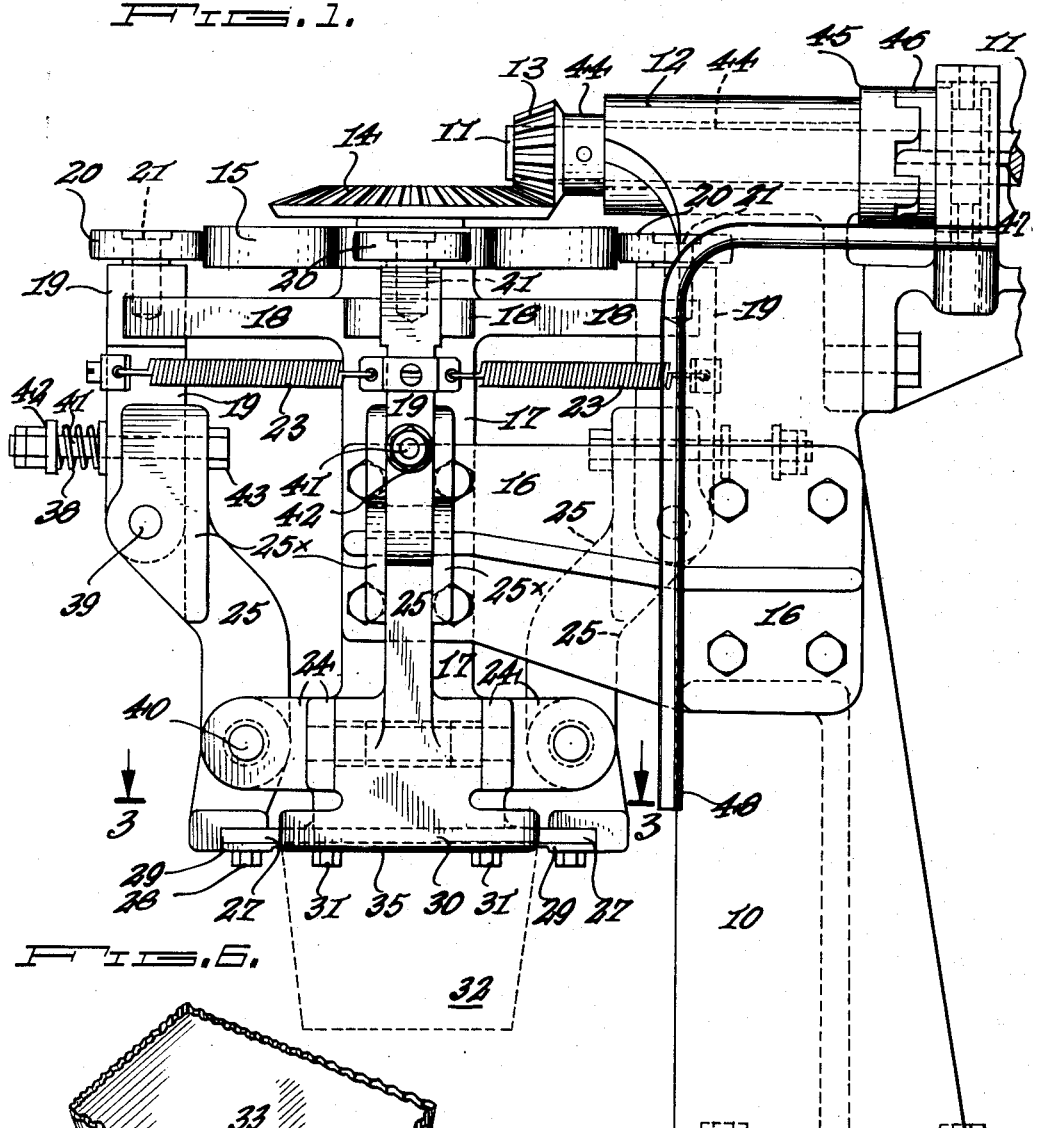
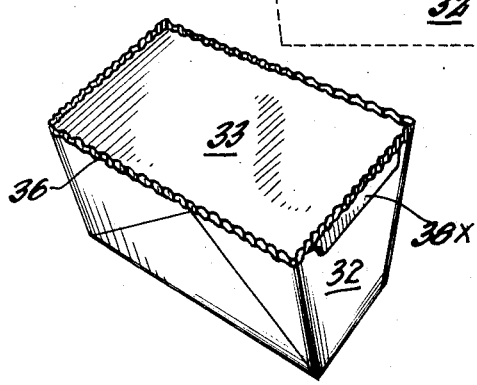
INVENTOR.
Gordon Hammond
BY
ATTORNEY.

Dec. 29, 1953 — G. HAMMOND — 2,664,060
MACHINE FOR CLOSING CONTAINERS
Filed March 23, 1950
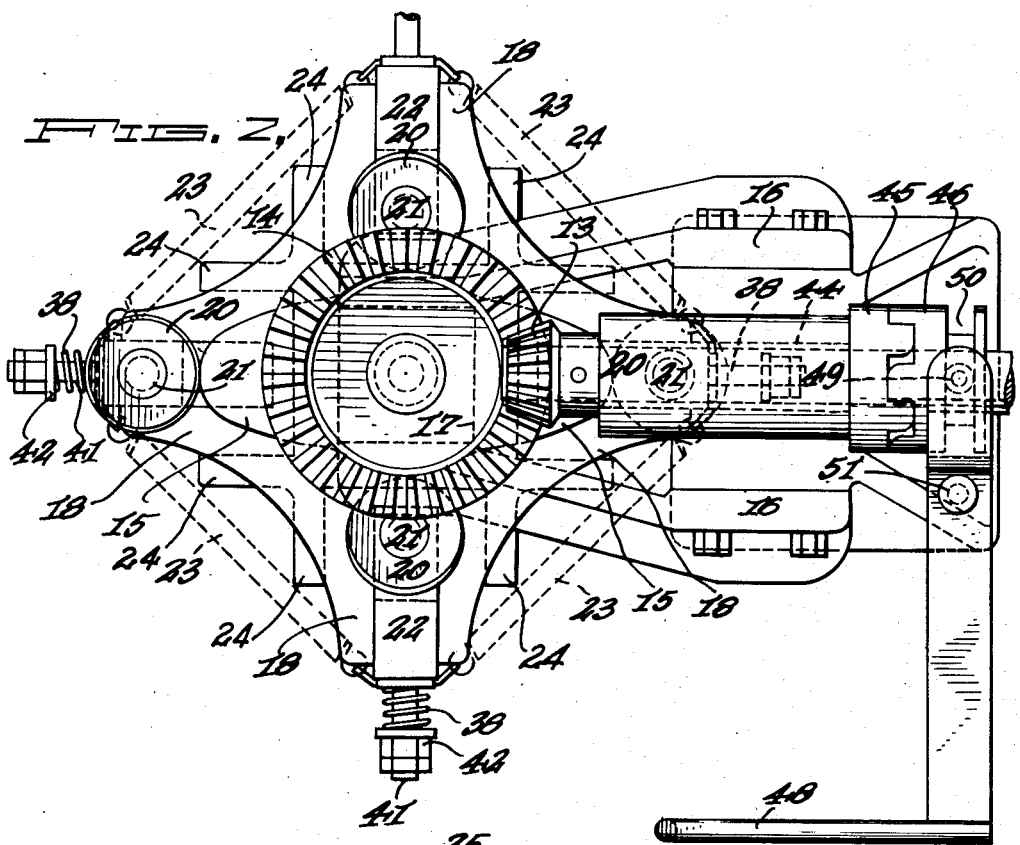
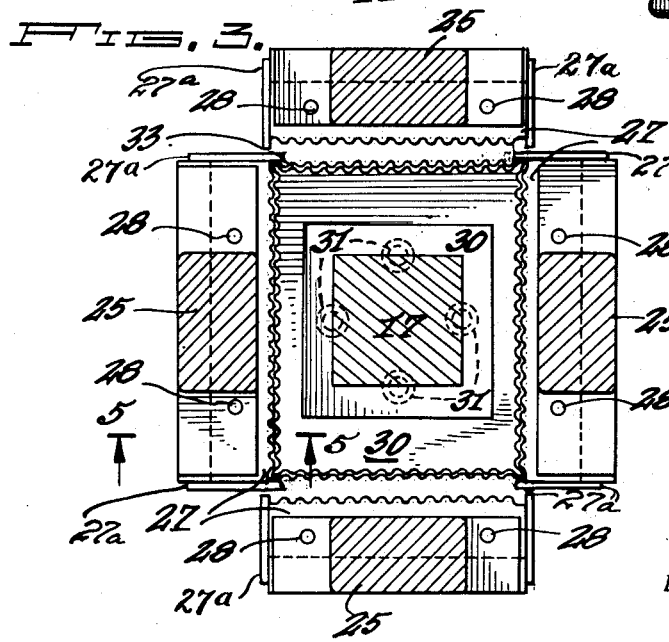
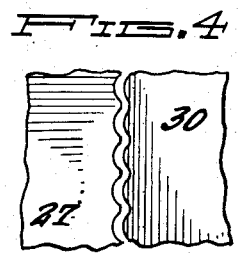
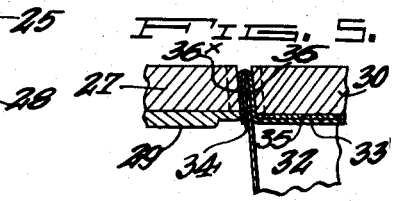
INVENTOR.
Gordon Hammond
ATTORNEY.

Patented Dec. 29, 1953

2,664,060

UNITED STATES PATENT OFFICE 2,664,060

MACHINE FOR CLOSING CONTAINERS

Gordon Hammond, Ashland, Va., assignor to Reynolds Metals Company, Richmond, Va., a corporation of Delaware Application March 23, 1950, Serial No. 151,346

3 Claims. (Cl. 113—18)

This invention relates to a machine for closing containers and in particular to a machine for securing a pre-formed lid to a metal container.

In certain applications, such as for instance in the packaging of food or frozen food, it is desirable to first fill the container and then securely and automatically close it so that the closing operation requires a minimum of time and supervision.

It is a further object of this invention to provide a closed container which can be readily opened to make its contents accessible.

According to the present invention, the metal container is filled, the lid is placed on the container in such a manner that a common rim is formed, i. e., a rim involving portions of the container as well as of the lid, and the rim is acted on by a forming process whereby corrugations are impressed thereon securely joining the lid to the container in a simple, rapid and efficient manner.

Other objects and advantages of the present invention will become apparent in conjunction with the following specification and drawings in which:

Fig. 1 is a front view of the apparatus for closing containers according to the present invention with a container in place;

Fig. 2 is a top view of the apparatus shown in Fig. 1;

Fig. 3 is a cross-sectional view taken on line 3—3 of Fig. 1;

Fig. 4 is an enlarged view of part of Fig. 3, showing the crimped edges of the forming dies;

Fig. 5 is a cross-sectional view taken on the line 5—5 of Fig. 3; and

Fig. 6 is a perspective view showing a container and a lid attached by the machine of this invention.

Referring to Figs. 1 and 2, a vertical frame 10, which carries a housing 12, rotatably supports a bearing sleeve 44 surrounding a shaft 11. The bearing sleeve 44 is connected to the driven part 45 of a clutch, the driving part 46 of which is locked at 47 to the shaft 11 which is rotated by any suitable apparatus, not shown, such as a motor. The two members 45 and 46 of the clutch can be engaged or disengaged by operation of the handle 48, controlling the lateral position of pin 49 which runs in groove 50 when rocked on pivot 51. The bearing sleeve 44 carries a bevel pinion 13 which drives the bevel gear 14, carrying an oval-shaped cam 15.

The frame 10 further carries two brackets 16 which are bolted to a vertical post 17 having at its top four horizontally extending forked guide arms 18. The forks of these guide arms receive levers 19. The levers 19 are actuated by cam followers 20, cooperating with the oval cam 15, the cam followers 20 rotating on axles 21 carried by the jaw supports or levers 19. Guide arms 18 have guide slots 22 for radial guidance of levers 19 as the cam is rotated. Springs 23 are employed for forcing the levers 19, and indirectly the cam followers 20, radially inwardly to insure that the cam followers 20 are always in good contact with the cam 15.

The vertical post 17 has four lower horizontal forked extensions 24, each of which pivotally carries one of die holders 25, the latter being carried in a special manner by the levers 19.

As shown in more detail in Fig. 3, dies 27, having crimping faces, are screwed to die holders 25 by screws 28 which also hold dies 29. The dies 29 have flat forming faces. A central forming plate 30 is secured to the central support 17 by means of screws 31. The crimping edges of the forming plate 30 as well as those of the dies 27 are shown in Fig. 4.

Fig. 5 illustrates in section the relative positions and the configuration of the container 32 and the lid 33 between the central forming plate 30 and the jaw 27. The margin 34 of the container walls is bent outwardly and over completely which strengthens this portion of the container and eliminates the sharp metal edges at the upper rim. The lid 33 is inserted into the upper section of the container. Its margin has been preformed with a channel, as shown in Fig. 5, which channel receives the vertical walls of the container. Thus an upstanding rim is formed along the upper margin of the container-lid assembly. Such assembly is freely accessible so that it can be subjected to a die-forming process.

In the subsequent die forming process the four superposed metal layers of the lid and container assembly are oppositely and simultaneously crimped between dies 27 and forming plate 30, impressing corrugations onto the strip area of the upper rim, while a strip area below the crimped margin is pressed together flat by forming plates 29 and 35. In this action, the opposite diagonal corners of the lid are aligned by corner fold clips, 27a. These clips are on opposed sides of opposed pairs of die holders 25.

The above arrangement assures a secure attachment of the lid to the container which can not slide off along the corrugation grooves, since these grooves are not continued to the edge of the lid which edge is pressed flat. A container 32 is shown in position in Fig. 1.

Referring to Figs. 5 and 6, the container 32 is provided with a lid 33 having crimped inner and outer marginal strips 36 and 36x, preferably carrying a flap 38x which may be bent outwardly for efficient grasping by the fingers to facilitate the opening of the container.

In operation of the closing machine, the cam 15 revolves and forces radially outwardly an opposed pair of cam followers 20 positioned adjacent the greater diameter of the oval-shaped cam. The outward movement of the cam followers causes an opposed pair of the levers 19, with their die holders 25 and attached dies 27 and clips 27a to move towards the central forming plate 30, as the assembly of levers and die holders rocks on the fulcrum 40.

Obviously each lever 19 and its die holder 25 moves as a unit. They are, however, pivoted together due to the action of the pivots 39. Relative movement on pivot 39 is normally prevented as to each lever-die holder assembly by a spring 38 on a shaft 41 (Fig. 1), the latter extending horizontally through lever 19. One end of the spring 38 engages said lever 19 and the opposite end engages an adjusting nut 42, threaded on the outer end of shaft 41.

When a lever 19 is moved outwardly, the applied force is transferred to an associated spring 38 and then transmitted, first to nut 42 and thence to a head nut 43 located on shaft 41, the head nut 43 engaging the spaced guide extensions 25x carried by an associated die holder 25.

The springs 38 prevent application of too large a force to the container-lid assembly, since at a predetermined abnormal action thrust of the dies the springs will be compressed, permitting levers 19 to move outwardly on the die holders 25.

It will be understood that various modifications may be made in the form and arrangement of the elements constituting the embodiment illustrated and described without departing from the spirit of the invention.

Having thus described my invention, what I claim and desire to secure by Letters Patent is as follows:

1. A machine for securing metal lids to metal containers comprising a vertical base, a pair of brackets horizontally disposed from said base, a post secured to said spaced-apart brackets in a vertical position, said post carrying a frame having bifurcated fingers disposed 90° apart from each other, a die holder pivotally secured to each of the bifurcated fingers, an arm pivoted to said die holder, an oval cam rotatably secured to the top of said post, a gear adapted to rotate said oval cam secured to the top of said oval cam, a plurality of rotatable cam followers secured to each of said arms, a top frame having four slots therein at spaced intervals at 90°, the said arm being disposed in said slot of said top frame, a plurality of springs disposed laterally and successively between said arms, said die holder having a first die therein having a corrugated face, and a second die having a flat face, said post being provided with a lower rectangular die having corrugations on all four sides.

2. The apparatus of claim 1 having spaced guide extensions carried by the die holder, the arm being provided with spring actuated rod retaining means removably secured to said spaced guide extensions, said arm being actuated by the cam followers co-acting with the cam whereby radial movement of the arm is transmitted through the said spring actuated rod means to the guide extensions secured to the die holder, whereby to and fro movement of the cam followers is translated to to and fro movement of the die holder.

3. The apparatus of claim 2 wherein the die holders are provided with corner clips and a central forming plate having corrugated edges is secured to the base of the post, whereby proper alignment of the forming plate with the dies of said die holder is obtained.

GORDON HAMMOND.

References Cited in the file of this patent

UNITED STATES PATENTS

| Number | Name | Date |
| --- | --- | --- |
| 227,823 | Perkins | May 18, 1880 |
| 549,375 | Lettelier | Nov. 5, 1895 |
| 877,375 | Rudolphi | Jan. 21, 1908 |
| 1,249,399 | Hood | Dec. 7, 1917 |
| 1,349,233 | Stephenson | Aug. 10, 1920 |
| 1,349,234 | Stephenson | Aug. 10, 1920 |
| 1,687,943 | Lange | Oct. 16, 1928 |
| 2,527,885 | Krueger | Oct. 31, 1950 |

FOREIGN PATENTS

| Number | Country | Date |
| --- | --- | --- |
| 670,696 | France | Dec. 2, 1929 |